(12) United States Patent
Choi et al.

(10) Patent No.: US 9,804,987 B2
(45) Date of Patent: Oct. 31, 2017

(54) SEMICONDUCTOR DEVICE FOR REDUCING POWER CONSUMPTION IN LOW POWER MODE AND SYSTEM INCLUDING SAME

(71) Applicant: SAMSUNG ELECTRONICS CO., LTD., Suwon-si, Gyeonggi-do (KR)

(72) Inventors: Kwang Hee Choi, Seoul (KR); Oh Sung Kwon, Seoul (KR); Tae Min Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 268 days.

(21) Appl. No.: 14/816,232

(22) Filed: Aug. 3, 2015

(65) Prior Publication Data
US 2016/0041604 A1 Feb. 11, 2016

(30) Foreign Application Priority Data

Aug. 6, 2014 (KR) .................. 10-2014-0101251

(51) Int. Cl.
*G06F 1/32* (2006.01)
*G06F 13/40* (2006.01)
*G06F 13/42* (2006.01)

(52) U.S. Cl.
CPC ........ *G06F 13/4022* (2013.01); *G06F 1/3253* (2013.01); *G06F 13/4282* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 6,795,450 B1 | 9/2004 | Mills et al. | |
| 7,188,263 B1 * | 3/2007 | Rubinstein | G06F 1/3209 713/300 |
| 7,313,712 B2 | 12/2007 | Cherukuri et al. | |
| 7,965,741 B2 | 6/2011 | Frodsham et al. | |
| 7,984,314 B2 | 7/2011 | Cooper et al. | |
| 8,446,903 B1 * | 5/2013 | Ranganathan | H04L 49/109 370/359 |
| 8,582,448 B2 | 11/2013 | Khatri et al. | |
| 8,601,199 B2 | 12/2013 | Tolliver | |
| 9,043,526 B2 * | 5/2015 | Freking | G06F 9/4411 710/307 |
| 9,213,667 B2 * | 12/2015 | Cranford, Jr. | G06F 13/423 |

(Continued)

FOREIGN PATENT DOCUMENTS

KR 1110953 1/2012
KR 1154148 5/2012
(Continued)

*Primary Examiner* — Cheng-Yuan Tseng
(74) *Attorney, Agent, or Firm* — Volentine & Whitt, PLLC

(57) ABSTRACT

A semiconductor device can reduce power consumption in a low power mode and includes a first input/output circuit configured to detect a first entry signal transiting at a first time and output a detection signal indicating an entry into a power saving mode according to a result of the detection. A second input/output circuit is configured to receive a second entry signal transiting at a second time earlier than the first time, and a control circuit is configured to block power supplied to the second input/output circuit in response to the detection signal indicating the entry.

20 Claims, 5 Drawing Sheets

(56) References Cited

U.S. PATENT DOCUMENTS

2006/0034295 A1    2/2006   Cherukuri et al.
2013/0145191 A1    6/2013   Hung et al.

FOREIGN PATENT DOCUMENTS

| KR | 20120066986 A | 6/2012 |
| KR | 20120129625 A | 11/2012 |
| KR | 1253928 | 4/2013 |

\* cited by examiner

SEMICONDUCTOR DEVICE FOR REDUCING POWER CONSUMPTION IN LOW POWER MODE AND SYSTEM INCLUDING SAME

CROSS-REFERENCE TO RELATED APPLICATIONS

This application claims priority under 35 U.S.C. §119(a) from Korean Patent Application No. 10-2014-0101251 filed on Aug. 6, 2014, the disclosure of which is hereby incorporated by reference in its entirety

BACKGROUND

Embodiments of the present inventive concept relate to a semiconductor device, and more particularly, to a semiconductor device that can reduce power consumption in a low power mode while using a plurality of lanes, and a system including the same.

The peripheral component interconnect express (PCIe) is a high-speed serial computer expansion bus standard designed for replacing a PCI bus standard or a Peripheral Component Interconnect Extended (PCI-X) bus standard. The PCIe uses a lane. The lane includes two differential signaling pairs. One pair is used to receive data, and the other pair is used to transfer data. The PCIe uses a link which includes one, two, four, eight, twelve, sixteen, or thirty-two lanes.

Although a semiconductor device which supports the PCIe enters an L1 state or an L1 mode which is a low power mode, the semiconductor device needs to supply power to each of a plurality of physical medium attachment sub-layers (PMAs) connected to each of a plurality of lanes. Accordingly, although a semiconductor device which includes the plurality of PMAs and supports the PCIe operates in a low power mode, a substantially large amount of power is consumed by the plurality of PMAs which maintains a standby state.

SUMMARY

A technical object of the present inventive concept is to provide a semiconductor device that can perform a wake-up using only one of a plurality of input/output circuits (for example, a plurality of PMAs) so as to reduce power consumption in a low power mode, and a system having the same.

An example embodiment of the present inventive concept is directed to a semiconductor device, including a first input/output circuit configured to detect a first entry signal transiting at a first time, and output a detection signal indicating an entry into a power saving mode according to a result of the detection, a second input/output circuit configured to receive a second entry signal transiting at a second time earlier than the first time, and a control circuit configured to block power supplied to the second input/output circuit in response to the detection signal indicating the entry. The first entry signal may toggle at least once before the first time.

The semiconductor device may be a Peripheral Component Interconnect Express (PCIe) device, and the detection signal indicating the entry may be related to a detection of an electrical idle ordered set (EIOS) or an absence of electrical differential signals.

In an embodiment, the first input/output circuit detects a first exit signal transiting at a third time, and generates the detection signal indicating an exit from the power saving mode according to a result of the detection. The control circuit supplies the power back to the second input/output circuit in response to the detection signal indicating the exit, and the second input/output circuit receives a second exit signal transiting at a fourth time later than the third time.

The first exit signal may toggle at least once after the third time. The detection signal indicating the exit may be related to a detection of an electrical idle exit ordered set (EIEOS) or a presence of electrical differential signals.

In an embodiment, the first input/output circuit includes a squelch detector which detects one of the EIOS and the EIEOS, and generates the detection signal. The first input/output circuit and the second input/output circuit may be physical medium attachment sub-layers (PMAs) embodied in a physical layer. The control circuit includes a physical coding sub-layer (PCS) which is embodied in the physical layer and generates a control signal in response to the detection signal, and a power management unit which controls a supply of the power to the second input/output circuit based on the control signal.

An example embodiment of the present inventive concepts is directed to a semiconductor system, including a first semiconductor device, a second semiconductor device, and a first lane and a second lane connected between the first semiconductor device and the second semiconductor device. The second semiconductor device includes a first input/output circuit which is connected to the first lane, detects a first entry signal transiting at a first time, and outputs a detection signal indicating an entry into a power saving mode according to a result of the detection, a second input/output circuit which receives a second entry signal transiting at a second time earlier than the first time, and a control circuit which blocks a power supplied to the second input/output circuit in response to the detection signal indicating the entry.

In an embodiment, the first input/output circuit detects a first exit signal transiting at a third time, and generates the detection signal indicating an exit from the power saving mode according to a result of the detection. The control circuit supplies the power back to the second input/output circuit in response to the detection signal indicating the exit, and the second input/output circuit receives a second exit signal transiting at a fourth time later than the third time.

In various embodiments, each of the first semiconductor device and the second semiconductor device is a peripheral component interconnect express (PCIe) device, the detection signal indicating the entry is related to an electrical idle ordered set (EIOS) or an absence of electrical differential signals, and the detection signal indicating the exit is related to an electrical idle exit ordered set (EIEOS) or a presence of electrical differential signals.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EMBODIMENTS

Figure 1:
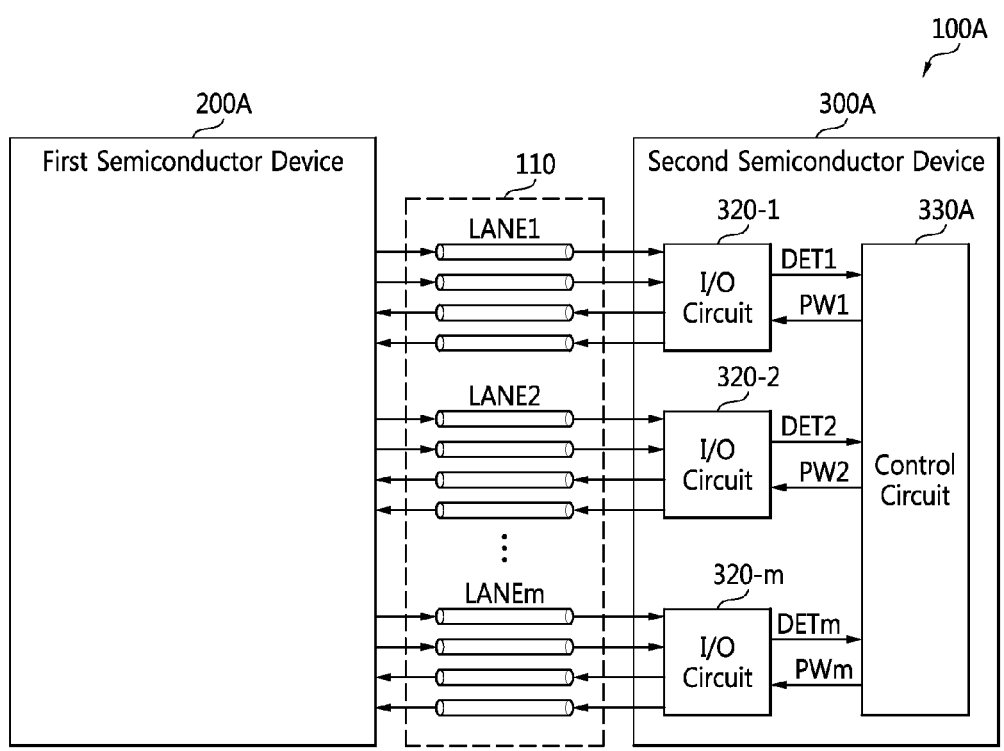
FIG. 1 is a block diagram of a semiconductor device according to an exemplary embodiment of the present inventive concept.

The present inventive concept will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a semiconductor system according to an exemplary embodiment of the present inventive concept. Referring to FIG. 1, a semiconductor system 100A includes a first semiconductor device 200A and a second semiconductor device 300A which are connected to each other through a link 110. According to exemplary embodiments, each of the semiconductor devices 200A and 300A may be embodied in a solid state drive or solid state disk (SSD). According to another exemplary embodiment, the first semiconductor device 200A may perform a function of a master, and the second semiconductor device 300A may perform a function of a slave.

The first semiconductor device 200A and the second semiconductor device 300A may transmit or receive data to or from each other through the link 110. For example, the link 110 may include a plurality of lanes LANE1 to LANEm, where m is a natural number equal to or more than two. For example, m may be 2, 4, 8, 12, 16, or 32; however, m is not limited thereto.

The link defines a communication connection between two semiconductor devices, and the lane defines a single transmit/receive pair connection between two semiconductor devices. Two semiconductor devices may transmit or receive data in one lane in both directions at the same time. The link 110 may be a high-speed serial interface.

The second semiconductor device 300A includes a plurality of input/output circuits 320-1 to 320-m and a control circuit 330A. According to an exemplary embodiment, the plurality of input/output circuits 320-1 to 320-m may be embodied in a physical layer. According to another exemplary embodiment, the control circuit 330A may be embodied in a physical layer. The second semiconductor device 300A may control a power state of each of the rest of the lanes except for the first lane among the plurality of lanes LANE1 to LANEm using a power mode indication signal input via a first lane among the plurality of lanes LANE1 to LANEm.

The power mode indication signal may define an entry signal which indicates an entry into a power saving mode, a low power mode, an idle mode, or an L1 state. Moreover, the power mode indication signal may be an exit signal which indicates an exit from the power saving mode, the low power mode, the idle mode, or the L1 state.

According to exemplary embodiments, a power state may define a power-on state which supplies power (or an operational voltage) to a corresponding input/output circuit, a power-off state which blocks (or interrupts) power supplied to a corresponding input/output circuit, or a link power state.

A first input/output circuit 320-1 is electrically connected to a first lane LANE1, and each of a plurality of second input/output circuits 320-2 to 320-m is electrically connected to each of a plurality of second lanes LANE2 to LANEm. While data are transmitted or received, the first semiconductor device 200A and the second semiconductor device 300A may transmit and/or receive data using the plurality of lanes LANE1 to LANEm in a parallel manner or at the same time.

When an entry into the power saving mode, the low power mode, or the L1 state is performed, each input/output circuit 320-1 to 320-m may detect an entry signal received through each lane LANE1 to LANEm, and transmit each detection signal DET1 to DETm generated according to a result of the detection to the control circuit 330A.

The control circuit 330A may block (or interrupt) each power PW2 to PWm supplied to each of the plurality of second input/output circuits 320-2 to 320-m except for the first input/output circuit 320-1 in response to at least one of the detection signals DET1 to DETm. When an exit from the power saving mode, the low power mode, or the L1 state is performed, the first input/output circuit 320-1 may detect an exit signal received through the first lane LANE1 and transmit a first detection signal DET1 generated according to a result of the detection to the control circuit 330A.

Accordingly, the control circuit 330A may supply each blocked (or interrupted) power PW2 to PWm back to each of the plurality of second input/output circuits 320-2 to 320-$m$. A power domain including each input/output circuit 320-1 to 320-$m$ may be independently controlled according to a control of the control circuit 330A.

Figure 2:
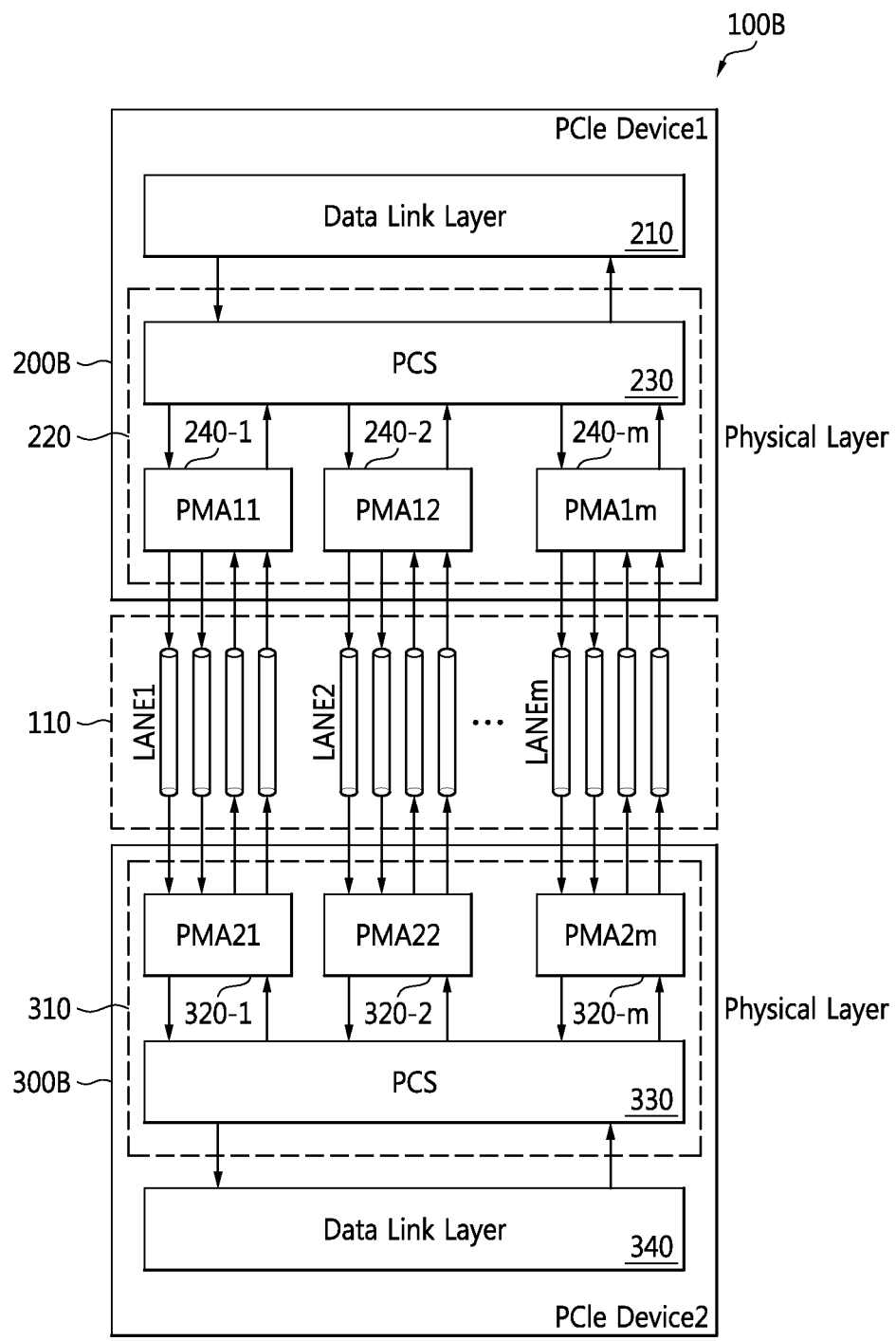
FIG. 2 is a block diagram of a semiconductor system according to another exemplary embodiment of the present inventive concept.

FIG. 2 is a block diagram of a semiconductor system according to another exemplary embodiment of the present inventive concept. Referring to FIG. 2, a semiconductor system 100B may include a first semiconductor device 200B and a second semiconductor device 300B which are connected to each other via the link 110. For convenience of description in FIG. 2, each of the semiconductor devices 200B and 300B may be assumed to be a peripheral component interconnect express (PCIe) device.

A first PCIe device 200B may include a data link layer 210 and a physical layer 220. The physical layer 220 may include a physical coding sub-layer (PCS) 230 and a plurality of physical medium attachment sub-layers (PMAs) 240-1 to 240-$m$. A second PCIe device 300B may include a physical layer 310 and a data link layer 340. The physical layer 310 may include a plurality of PMAs 320-1 to 320-$m$ and a PCS 330.

The present specification may include contents of a PCI Express Base 3.0 Specification for example provided at http://www.pcisig.com as a reference. Therefore, it should be understood that the same term as a term defined in the PCI Express Base 3.0 Specification has the same meaning in the present specification.

The first PCIe device 200B and the second PCIe device 300B may transmit or receive data using the plurality of lanes LANE1 to LANEm at the same time. By connecting m lanes LANE1 to LANDm between the first PCIe device 200B and the second PCIe device 300B, a data throughput between the first PCIe device 200B and the second PCIe device 300B is m times more than a data throughput when using one lane.

Figure 3:
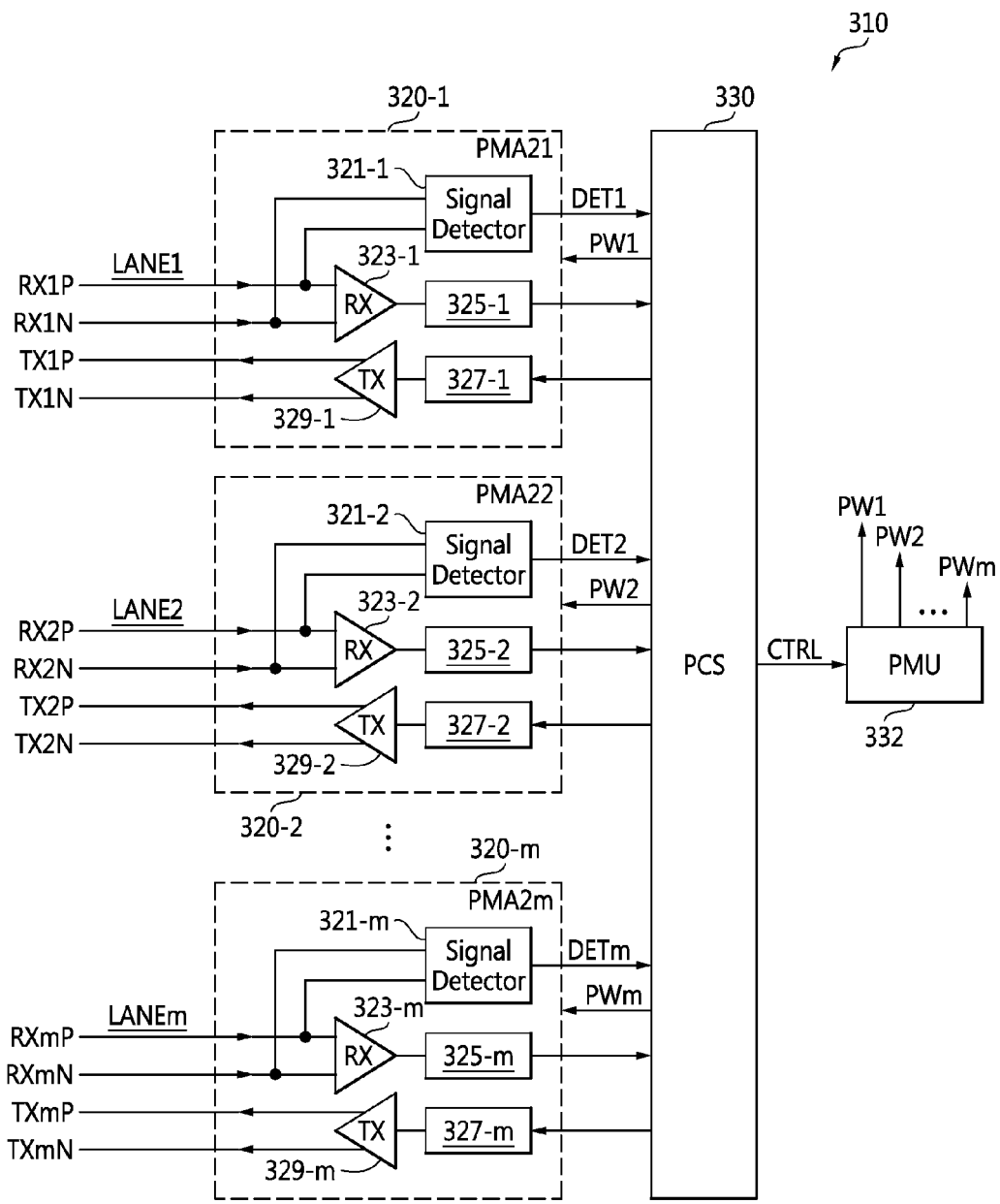
FIG. 3 is a detailed block diagram of a physical layer of a second semiconductor device shown in FIG. 2.

FIG. 3 is a detailed block diagram of a physical layer of a second semiconductor device shown in FIG. 2. Referring to FIGS. 2 and 3, the physical layer 310 may include the plurality of PMAs 320-1 to 320-$m$ and the PCS 330. According to embodiments, a power management unit (PMU) 332 may be or may not be embodied in the physical layer 310. Each of the PMAs 320-1 to 320-$m$ of FIG. 3 may correspond to each of the input/output circuit 320-1 to 320-$m$ of FIG. 1, and the PCS 330 and the PMU 332 of FIG. 3 may correspond to the control circuit 330A of FIG. 1.

The first PMA 320-1 may include a signal detector 321-1, a receiver 323-1, a reception signal processing circuit 325-1, a transmission signal processing circuit 327-1, and a transmitter 329-1. The signal detector 321-1 may detect first differential reception signals RX1P and RX1N received through the first lane LANE1, particularly an entry signal or an exit signal, and transmit the first detection signal DET1 to the PCS 330. The receiver 323-1 may amplify a difference between the first differential reception signals RX1P and RX1N and transmit amplified signals to the reception signal processing circuit 325-1. The reception signal processing circuit 325-1 may convert the amplified signals into signals which may be processed by the PCS 330.

The transmission signal processing circuit 327-1 may convert signals output from the PCS 330 into signals which can be processed by the transmitter 329-1. The transmitter 329-1 may amplify a difference between output signals of the transmission signal processing circuit 327-1, and output amplified signals as first differential transmission signals TX1P and TX1N.

A second PMA 320-2 may include a signal detector 321-2, a receiver 323-2, a reception signal processing circuit 325-2, a transmission signal processing circuit 327-2, and a transmitter 329-2. The signal detector 321-2 may detect second differential reception signals RX2P and RX2N received through a second lane LANE2, particularly an entry signal or an exit signal, and transmit a second detection signal DET2 to the PCS 330. The receiver 323-2 may amplify a difference between the second differential reception signals RX2P and RX2N, and transmit amplified signals to the reception signal processing circuit 325-2.

The reception signal processing circuit 325-2 may convert the amplified signals into signals which can be processed by the PCS 330. The transmission signal processing circuit 327-2 may convert signals output from the PCS 330 into signals which can be processed by the transmitter 329-2. The transmitter 329-2 may amplify a difference between output signals of the transmission signal processing circuit 327-2, and output amplified signals as second differential transmission signals TX2P and TX2N.

An $m^{th}$ PMA 320-$m$ may include a signal detector 321-$m$, a receiver 323-$m$, a reception signal processing circuit 325-$m$, a transmission signal processing circuit 327-$m$, and a transmitter 329-$m$. The signal detector 321-$m$ may detect $m^{th}$ differential reception signals RXmP and RXmN received through an $m^{th}$ lane LANEm, particularly an entry signal or an exit signal, and transmit an $m^{th}$ detection signal DETm to the PCS 330.

The receiver 323-$m$ may amplify a difference between $m^{th}$ differential reception signals RXmP and RXmN, and transmit amplified signals to the reception signal processing circuit 325-$m$. The reception signal processing circuit 325-$m$ may convert the amplified signals into signals which can be processed by the PCS 330.

The transmission signal processing circuit 327-$m$ may convert signals output from the PCS 330 into signals which can be processed by the transmitter 329-$m$. The transmitter 329-$m$ may amplify a difference between output signals of the transmission signal processing circuit 327-$m$ and output amplified signals as $m^{th}$ differential transmission signals TXmP and TXmN.

Each of the signal detectors 321-1 to 321-$m$ may detect an entry signal or an exit signal and transmit each detection signal DET1 to DETm to the control circuit 330. According to an exemplary embodiment, each signal detector 321-1 to 321-$m$ may perform a function of differentially detecting the presence of a communication signal (for example, an entry signal or an exit signal) in each lane LANE1 to LANEm. Accordingly, each signal detector 321-1 to 321-$m$ may be embodied in a squelch detector. For example, the entry signal may be an electrical idle ordered set (EIOS), and the exit signal may be an electrical idle exit ordered set (EIEOS).

The PCS 330 may generate a control signal CTRL in response to at least one of the detection signals DET1 to DETm. The PMU 332 may supply or block each power PW1 to PWm to or from each PMA 320-1 to 320-$m$. That is, the PMU 332 may independently control power (a power state) of each PMA 320-1 to 320-$m$. For example, a power PW1 supplied to the first PMA 320-1 can be maintain all the time.

As illustrated, it is shown that each reference PW1 to PWm shown in FIGS. 1 and 3 defines a power supplied to each PMA 320-1 to 320-$m$; however, each reference PW1 to PWm may define a switch signal which controls a supply or a blocking of power to or from each PMA 320-1 to 320-$m$.

Figure 4:
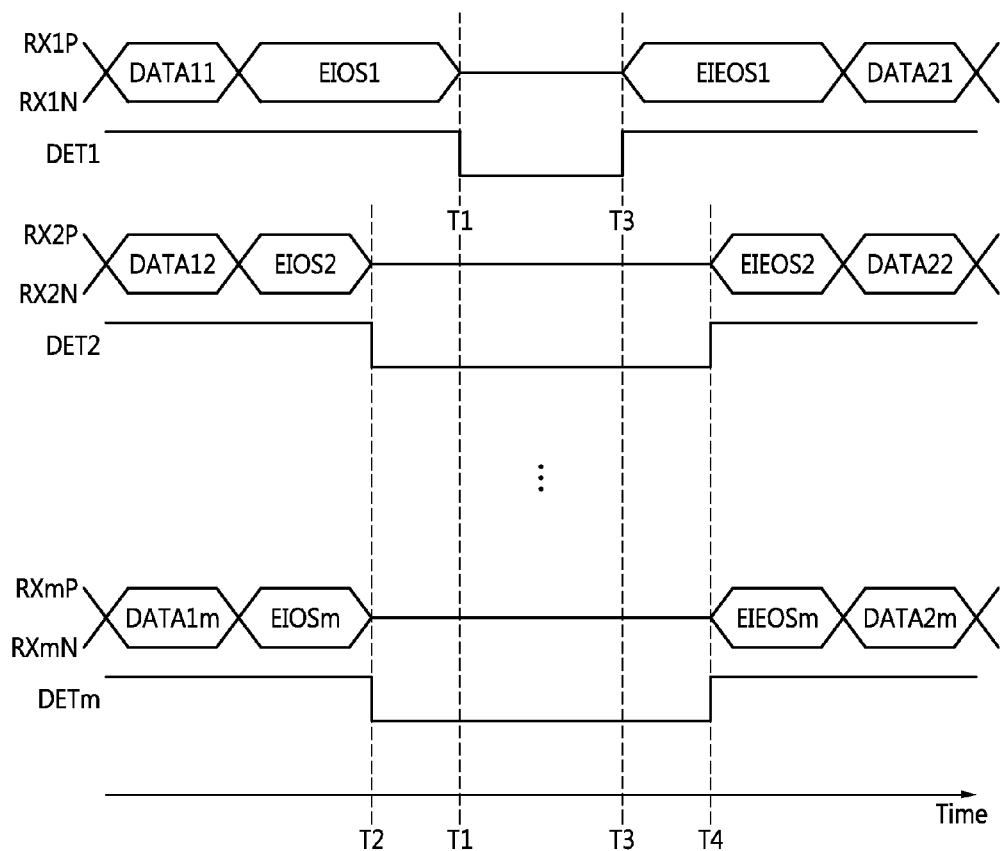
FIG. 4 is a timing diagram for describing an operation of the second semiconductor device shown in FIG. 3.

FIG. 4 is a timing diagram for describing an operation of the second semiconductor device shown in FIG. 3. Referring to FIGS. 2 to 4, the PCIe devices 200B and 300B may transmit or receive each data DATA11, DATA12, . . . , DATA1m through each of the lanes LANE1, LANE2, . . . , LANEm in a state of transmitting or receiving data, or in the L0 state. If there is no PCIe logical data transmission between the PCIe devices 200B and 300B during a given time in the L0 state, the first PCIe device 200B may transmit each entry signal, e.g., EIOS1 to EIOSm, to each of the lanes LANE1 to LANEm so as to reduce power consumption of the second PCIe device 300B.

As shown in FIG. 4, a first entry signal EIOS1 transmitted through the first lane LANE1 may transit at the first time T1. For convenience of description in FIG. 4, it is shown as an example that the first entry signal EIOS1 transits from a first level, e.g., a high level, to a second level, e.g., a low level, at the first time T1; however, the embodiment is not limited thereto. However, each entry signal EIOS2 to EIOSm transferred through each of the lanes LANE2 to LANEm except for the first lane LANE1 transits at the second time T2 earlier than the first time T1. Here, a transition may mean a change of the first entry signal EIOS 1 or a change in a difference between the first entry signals EIOS 1 which are differential signals.

Each signal detector 321-1 to 321-m embodied in each PMA 320-1 to 320-m may detect each entry signal, e.g., each EIOS EIOS1 to EIOSm, and transmit each detection signal DET1 to DETm generated according to a result of the detection to the PCS 330.

The PCS 330 may generate a control signal CTRL in response to each detection signal DET1 to DETm. The PCS 330 may control an entry into a power saving mode in response to a first detection signal DET1 generated based on the first entry signal EIOS 1 transiting at the first time T1. For example, when a power PW1 supplied to the first PMA 320-1 is designed to be maintained, the PMU 332 operating according to a control signal CTRL may maintain only the power PW1 supplied to the first PMA 320-1, and block each power PW2 to PWm supplied to each of the rest PMAs 320-2 to 320-m.

Accordingly, a power state of the link 110 (herein, simply referred to as "link power state") can be changed from the L0 state (L0 mode) to the L1 state (L1 mode).

According to an exemplary embodiment, the PCS 330 may generate a control signal CTRL for an entry into the power saving mode in response to the first detection signal DET1 generated at the first time T1.

As exemplarily shown in FIG. 4, a length of the first entry signal EIOS 1 is relatively longer than a length of each entry signal EIOS2 to EIOSm. The first PCIe device 200B which intends to transmit data to the second PCIe device 300B may transmit each exit signal, e.g., each EIEOS EIEOS1 to EIEOSm to each of the lanes LANE1 to LANEm.

As shown in FIG. 4, the first exit signal EIEOS 1 transmitted through the first lane LANE1 transits at a third time T3. However, each exit signal EIEOS2 to EIEOSm transmitted through each of the lanes LANE2 to LANEm except for the first lane LANE1 transits at a fourth time T4 which is later than the third time T3. In terms of an order of time flow, the first time T1 is later than the second time T2, the third time T3 is later than the first time T1, and the fourth time T4 is later than the third time T3.

Each signal detector 321-1 to 321-m embodied in each PMA 320-1 to 320-m may detect each exit signal, e.g., each EIEOS EIEOS1 to EIEOSm, and transmit each detection signal DET1 to DETm generated according to a result of the detection to the PCS 330. The PCS 330 generates a control signal CTRL in response to each detection signal DET1 to DETm. The PCS 330 may control an exit from the power saving mode in response to the first detection signal DET1 generated based on the first exit signal EIEOS 1 transiting at the third time T3.

Since only a signal detector 321-1 of the first PMA 320-1 may maintain an activation state, the signal detector 321-1 may detect the first exit signal, e.g., EIEOS1, generate the first detection signal DET1, and transmit a generated first detection signal DET1 to the PCS 330. The PCS 330 may transmit a control signal CTRL to the PMU 332 in response to the first detection signal DET1. The PMU 332 may supply each blocked power PW2 to PWm back to each of the PMAs 320-2 to 320-m in response to a control signal CTRL. When each of the PMAs 320-2 to 320-m is woken-up according to a supply of each power PW2 to PWm, a link power state is converted from the L1 state into the L0 state. Therefore, the second PCIe device 300B may prepare to transmit or receive data.

According to an exemplary embodiment, the PCS 330 may generate a control signal CTRL for an exit from the power saving mode in response to the first detection signal DET1 generated at the third time T3. As exemplarily shown in FIG. 4, a length of the first exit signal EIEOS1 is relatively longer than a length of each exit signal EIEOS2 to EIEOSm.

Figure 5:
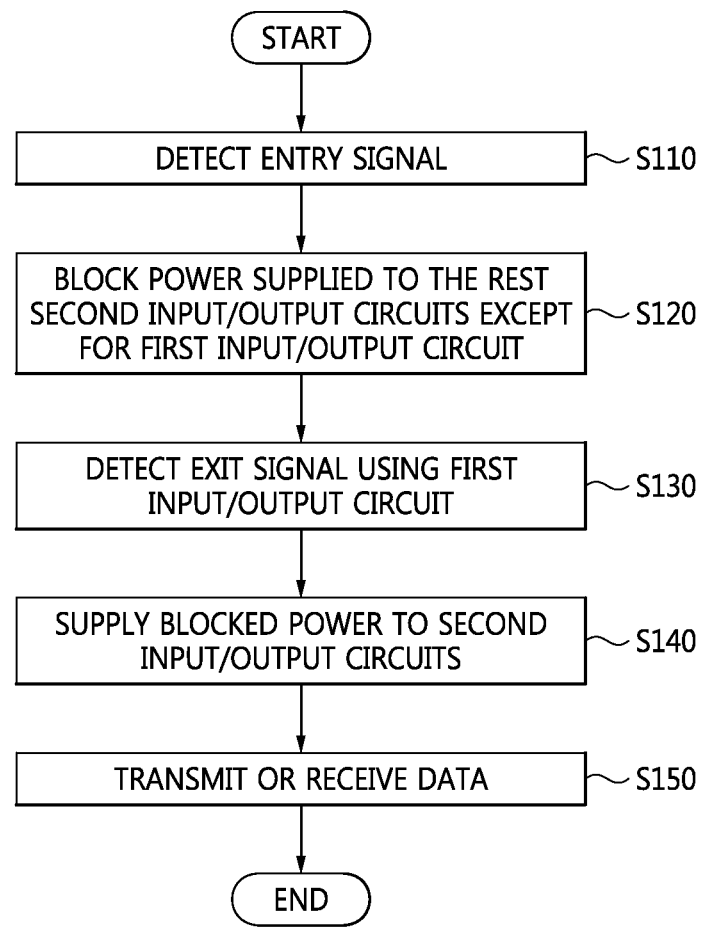
FIG. 5 is a flowchart for describing a method according to an exemplary embodiment of the present inventive concept.

FIG. 5 is a flowchart for describing a method according to an exemplary embodiment of the present inventive concept. Referring to FIGS. 1 to 5, the first input/output circuit 320-1 of the second semiconductor device 300A may detect a first entry signal EIOS 1 which is input through the first lane LANE1 and transit at the first time T1, and transmit the first detection signal DET1 which indicates (or instructs) an entry into the power saving mode to the control circuit 330A (S110).

The control circuit 330A may block each power PW2 to PWm supplied to all of the rest second input/output circuits 320-2 to 320-m except for the first input/output circuit 320-1(S120). The first input/output circuit 320-1 which maintains a power-on state may detect a first exit signal EIEOS1 which is input through the first lane LANE1 and transit at the third time T3, and transmit the first detection signal DET1 which indicates an exit from the power saving mode to the control circuit 330A (S130).

The control circuit 330A supplies each blocked power PW2 to PWm back to the second input/output circuits 320-2 to 320-m based on the first detection signal DET1 (S140). The first semiconductor device 200A and the second semiconductor device 300A may transmit or receive data through each of the lanes LANE1 to LANEm (S150). As described above, the control circuit 330A or the PCS 330 may determine an activation timing of each of the detection signals DET1 to DETm related to the entry signals EIOS1 to EIOSm, and block the powers PW2 to PWm supplied to the second input/output circuits 320-2 to 320-m in response to the first detection signal DET1 which is the last to be activated among the detection signals DET1 to DETm (S120).

Moreover, the control circuit 330A or the PCS 330 may determine an activation timing of each of the detection signals DET1 to DETm related to the exit signals EIEOS1 to EIEOSm, and supply the powers PW2 to PWm back to the second input/output circuits 320-2 to 320-m in response to the first detection signal DET1 which is the first to be activated among the detection signals DET1 to DETm (S140).

A semiconductor device according to an exemplary embodiment of the present inventive concept may supply power to only one of a plurality of input/output circuits (or a plurality of PMAs) and block each power supplied to the rest input/output circuits after an entry into a power saving mode, thereby reducing power consumption of the semiconductor device in the power saving mode.

In addition, the semiconductor device may sense or detect an exit signal output from the other semiconductor device using only one input/output circuit which is provided with power during an exit from the power saving mode, and supply each blocked power to each of the rest input/output circuits according to a result of the sensing. Moreover, the semiconductor device may independently control each power state of the input/output circuits.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A semiconductor device comprising:
   a first input/output circuit configured to detect a first entry signal transiting at a first time and output a detection signal indicating an entry into a power saving mode according to a result of the detection;
   a second input/output circuit configured to receive a second entry signal transiting at a second time earlier than the first time; and
   a control circuit configured to block power supplied to the second input/output circuit in response to the detection signal indicating the entry into the power saving mode.

2. The semiconductor device of claim 1, wherein the first entry signal toggles at least once before the first time.

3. The semiconductor device of claim 1, wherein the semiconductor device defines a Peripheral Component Interconnect Express (PCIe) device; and wherein the detection signal indicating the entry is related to a detection of an electrical idle ordered set (EIOS) or an absence of electrical differential signals.

4. The semiconductor device of claim 3, wherein the first input/output circuit is configured to detect a first exit signal transiting at a third time, and generate the detection signal indicating an exit from the power saving mode according to a result of the detection; and wherein the control circuit is configured to supply the power back to the second input/output circuit in response to the detection signal indicating the exit; and the second input/output circuit is configured to receive a second exit signal transiting at a fourth time which is later than the third time.

5. The semiconductor device of claim 4, wherein the first exit signal toggles at least once after the third time.

6. The semiconductor device of claim 4, wherein the detection signal indicating the exit is related to a detection of an electrical idle exit ordered set (EIEOS) or a presence of electrical differential signals.

7. The semiconductor device of claim 6, wherein the first input/output circuit includes a squelch detector configured to detect one of the EIOS and the EIEOS and generate the detection signal.

8. The semiconductor device of claim 1, wherein each of the first input/output circuit and the second input/output circuit comprise physical medium attachment sub-layers (PMAs) embodied in a physical layer.

9. The semiconductor device of claim 8, wherein the control circuit includes:
   a physical coding sub-layer (PCS) embodied in the physical layer and configured to generate a control signal in response to the detection signal; and
   a power management unit configured to control a supply of the power to the second input/output circuit based on the control signal.

10. A semiconductor system comprising:
    a first semiconductor device;
    a second semiconductor device; and
    a first lane and a second lane connected between the first semiconductor device and the second semiconductor device;
    wherein the second semiconductor device includes
       a first input/output circuit connected to the first lane, configured to detect a first entry signal transiting at a first time, and configured to output a detection signal indicating an entry into a power saving mode according to a result of the detection;
       a second input/output circuit connected to the second lane, and configured to receive a second entry signal transiting at a second time earlier than the first time; and
       a control circuit configured to block power supplied to the second input/output circuit in response to the detection signal indicating the entry into the power saving mode.

11. The semiconductor system of claim 10, wherein the first entry signal toggles at least once before the first time.

12. The semiconductor system of claim 10, wherein the first input/output circuit is configured to detect a first exit signal transiting at a third time, and generate the detection signal indicating an exit from the power saving mode according to a result of the detection; wherein the control circuit is configured to supply the power back to the second input/output circuit in response to the detection signal indicating the exit; and the second input/output circuit is configured to receive a second exit signal transiting at a fourth time later than the third time.

13. The semiconductor system of claim 12, wherein each of the first semiconductor device and the second semiconductor device defines a peripheral component interconnect express (PCIe) device; and the detection signal indicating the entry is related to a detection of an electrical idle ordered set (EIOS) or an absence of electrical differential signals, and the detection signal indicating the exit is related to an electrical idle exit ordered set (EIEOS) or a presence of electrical differential signals.

14. The semiconductor system of claim 10, wherein the first input/output circuit and the second input/output circuit comprise physical medium attachment sub-layers (PMAs).

15. The semiconductor system of claim 14, wherein the control circuit includes:
    a physical coding sub-layer (PCS) embodied in the physical layer and configured to generate a control signal in response to the detection signal; and
    a power management unit configured to control ON/OFF of the power supplied to the second input/output circuit based on the control signal.

16. A method of operating a semiconductor system including a first semiconductor device and a second semiconductor device connected with a first lane and a second lane, the method comprising:
    detecting, with a first input/output circuit of the second semiconductor device connected to the first lane, a first entry signal transiting at a first time, and outputting a detection signal indicating an entry into a power saving mode according to a result of the detection;

receiving, with a second input/output circuit of the second semiconductor device connected to the second lane, a second entry signal transiting at a second time earlier than the first time; and blocking, with a control circuit of the second semiconductor device, power supplied to the second input/output circuit in response to the detection signal indicating the entry into the power saving mode.

17. The method of claim 16, wherein the first entry signal toggles at least once before the first time.

18. The method of claim 16, wherein the first input/output circuit is configured to detect a first exit signal transiting at a third time, and generate the detection signal indicating an exit from the power saving mode according to a result of the detection; wherein the control circuit is configured to supply the power back to the second input/output circuit in response to the detection signal indicating the exit; and the second input/output circuit is configured to receive a second exit signal transiting at a fourth time later than the third time.

19. The method of claim 18, wherein each of the first semiconductor device and the second semiconductor device defines a peripheral component interconnect express (PCIe) device; and the detection signal indicating the entry is related to a detection of an electrical idle ordered set (EIOS) or an absence of electrical differential signals, and the detection signal indicating the exit is related to an electrical idle exit ordered set (EIEOS) or a presence of electrical differential signals.

20. The method of claim 16, wherein the first input/output circuit and the second input/output circuit comprise physical medium attachment sub-layers (PMAs); and wherein the control circuit includes:

a physical coding sub-layer (PCS) embodied in the physical layer and configured to generate a control signal in response to the detection signal; and a power management unit configured to control ON/OFF of the power supplied to the second input/output circuit based on the control signal.

* * * * *